(12) United States Patent
Barajas Gonzalez et al.

(10) Patent No.: US 10,341,847 B2
(45) Date of Patent: Jul. 2, 2019

(54) REACTIONARY DATA TRANSFER TO COLD STORAGE

(71) Applicant: International Business Machines Corporation, Armonk, NY (US)

(72) Inventors: Emmanuel Barajas Gonzalez, Jalisco (MX); Shaun E. Harrington, Sahuarita, AZ (US); Benjamin K. Rawlins, Tucson, AZ (US); Jason E. Willerup, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 15/429,500

(22) Filed: Feb. 10, 2017

(65) Prior Publication Data

US 2018/0234835 A1    Aug. 16, 2018

(51) Int. Cl.
| | |
|---|---|
| G06F 15/173 | (2006.01) |
| H04W 8/20 | (2009.01) |
| H04L 12/58 | (2006.01) |
| H04W 68/02 | (2009.01) |
| H04M 1/725 | (2006.01) |
| H04W 4/50 | (2018.01) |

(52) U.S. Cl.
CPC .......... *H04W 8/205* (2013.01); *H04L 51/046* (2013.01); *H04L 51/24* (2013.01); *H04L 51/32* (2013.01); *H04M 1/72569* (2013.01); *H04W 4/50* (2018.02); *H04W 68/02* (2013.01); *H04M 1/72552* (2013.01)

(58) Field of Classification Search
CPC ....... H04W 8/205; H04W 4/50; H04W 68/02; H04M 1/72569; H04M 1/72552; H04L 51/046

USPC .................................................. 709/224, 203
See application file for complete search history.

(56) References Cited

U.S. PATENT DOCUMENTS

| | | |
|---|---|---|
| 5,481,670 A | 1/1996 | Hatashita et al. |
| 8,106,787 B2 | 1/2012 | Nurmi |
| 8,195,123 B2 | 6/2012 | Cho et al. |
| 8,583,103 B2 | 11/2013 | Avadhanam |

(Continued)

FOREIGN PATENT DOCUMENTS

WO    2017190103 A1    11/2017

OTHER PUBLICATIONS

Matero et al., "Identifying Unintentional Touches on Handheld Touch Screen Devices", DIS 2012, Copyright 2012 ACM 978-1-4503-1210—Mar. 12, 2016, Jun. 11-15, 2012, New Castle, UK, pp. 506-509.

(Continued)

*Primary Examiner* — Michael Won
(74) *Attorney, Agent, or Firm* — Gilbert Harmon, Jr.

(57) ABSTRACT

A method includes, sensing an impact to a mobile device, and determining, if there is any damage to a sensor array on the mobile device. Responsive to receiving information about the damage to the sensor array on the mobile device, determining, the mobile data settings for the mobile device. Responsive to receiving information about the mobile data settings for the mobile device, transferring the data from the mobile device to a configured storage service. The method determines the notification settings for the mobile device, and responsive to receiving instruction from notification settings, sends a notification to designated user contacts.

20 Claims, 4 Drawing Sheets

(56) References Cited

U.S. PATENT DOCUMENTS

| | | |
|---|---|---|
| 8,587,448 B1 | 11/2013 | Culleny |
| 8,878,810 B2 | 11/2014 | Ludwig |
| 9,152,650 B1 | 10/2015 | Raj et al. |
| 9,207,804 B2 | 12/2015 | Cudak et al. |
| 9,792,656 B1* | 10/2017 | Konrardy ................. H04W 4/90 |
| 9,885,706 B2 | 2/2018 | Vandersleen |
| 2003/0037287 A1 | 2/2003 | Nakamura et al. |
| 2004/0087303 A1 | 5/2004 | Pugliese |
| 2005/0003804 A1 | 1/2005 | Huomo et al. |
| 2005/0073426 A1 | 4/2005 | Hines et al. |
| 2006/0001920 A1 | 1/2006 | Moreno et al. |
| 2006/0055358 A1 | 3/2006 | Ogawa et al. |
| 2006/0183469 A1 | 8/2006 | Gadson |
| 2006/0240806 A1 | 10/2006 | Demirbasa et al. |
| 2008/0097663 A1 | 4/2008 | Morimoto et al. |
| 2008/0255778 A1 | 10/2008 | Liu et al. |
| 2010/0244705 A1 | 9/2010 | Hajjar et al. |
| 2010/0306485 A1 | 12/2010 | Dubhashi et al. |
| 2010/0323657 A1* | 12/2010 | Barnard ................ H04M 1/663 455/404.1 |
| 2011/0285516 A1* | 11/2011 | Ritter .................... H04W 88/04 340/286.02 |
| 2011/0287763 A1 | 11/2011 | Fujimoto et al. |
| 2012/0252441 A1 | 10/2012 | Fujimoto et al. |
| 2013/0148562 A1 | 6/2013 | Furuta et al. |
| 2013/0282660 A1 | 10/2013 | Xu |
| 2013/0298642 A1* | 11/2013 | Gillette, II .............. H02J 50/00 73/31.01 |
| 2014/0024348 A1* | 1/2014 | Hurst .................. H04M 3/5232 455/414.1 |
| 2014/0170672 A1 | 6/2014 | Vandersleen |
| 2014/0313896 A1* | 10/2014 | Koike ..................... H04J 3/085 370/235 |
| 2014/0375461 A1 | 12/2014 | Richardson |
| 2015/0094126 A1* | 4/2015 | Kreiner ............. H04M 1/72536 455/575.8 |
| 2015/0156100 A1* | 6/2015 | Skaaksrud ........... H04W 12/06 709/224 |
| 2015/0287033 A1 | 10/2015 | Page et al. |
| 2015/0350045 A1 | 12/2015 | Fan et al. |
| 2016/0138856 A1 | 5/2016 | Wilson |
| 2016/0217680 A1 | 7/2016 | Gu et al. |
| 2016/0259693 A1 | 9/2016 | Sundararaman et al. |
| 2016/0261739 A1* | 9/2016 | Mese ...................... H04M 3/42 |
| 2017/0346872 A1 | 11/2017 | Naik et al. |
| 2018/0234836 A1* | 8/2018 | Barajas Gonzalez ... H04L 51/32 |

OTHER PUBLICATIONS

Zhang et al., "Fingerprint Attack Against Touch-Enabled Devices", SPSM'12, Oct. 19, 2012, Raleigh, North Carolina, USA, Copyright 2012, ACM 978-1-4503-1666—Aug. 12, 2010, pp. 57-68.

Barajas Gonzalez et al., "Reactionary Data Transfer to Cold Storage", U.S. Appl. No. 15/842,949, IBM, Dec. 15, 2017, 30 pages.

IBM Appendix P, list of patents or patent applications treated as related, filed herewith, 2 pages.

* cited by examiner

REACTIONARY DATA TRANSFER TO COLD STORAGE

BACKGROUND OF THE INVENTION

The present invention relates generally to the field of mobile device sensors and remote storage, and more particularly to managing information storage based on mobile device damage detection.

Current communication devices, such as mobile phones, laptops, and or tablets, are tools utilized by individuals to capture and store information. This information can be very sentimental or extremely important work documents. The broadening scope of mobile device capability has led individuals to rely heavily on mobile devices for everyday use whether it is for communication, photographs, video recording, creating documents, editing documents, storing documents, etc. Reliance on mobile devices for everyday social, personal, and work life has resulted in a potential risk for an individual to lose their data when the mobile device is damaged.

SUMMARY

According to one embodiment of the present invention, a method, computer program product, and computer system for reactionary data transfer is provided. A computer implemented method includes sensing, by one or more processors, an impact to a mobile device. Determining, by one or more processors, if there is any damage to a sensor array on the mobile device, in which responsive to receiving information about the damage to the sensor array on the mobile device, determining, by one or more processors, if the mobile data settings are enabled. Responsive to receiving instructions from mobile data settings for the mobile device, transferring, by one or more processors, data from the mobile device to a configured storage service. Determining, by one or more processors, notification settings for the mobile device, and responsive to receiving instruction from notification settings, sending, by one or more processors, a notification to designated user contacts.

DETAILED DESCRIPTION

Embodiments of the present invention have the ability to sense damage of a mobile device transfer data and alert the owner as well as the manufacture and/or seller. Implementation of embodiments of the invention may take a variety of forms, and exemplary implementation details are discussed subsequently with reference to the Figures.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 1:
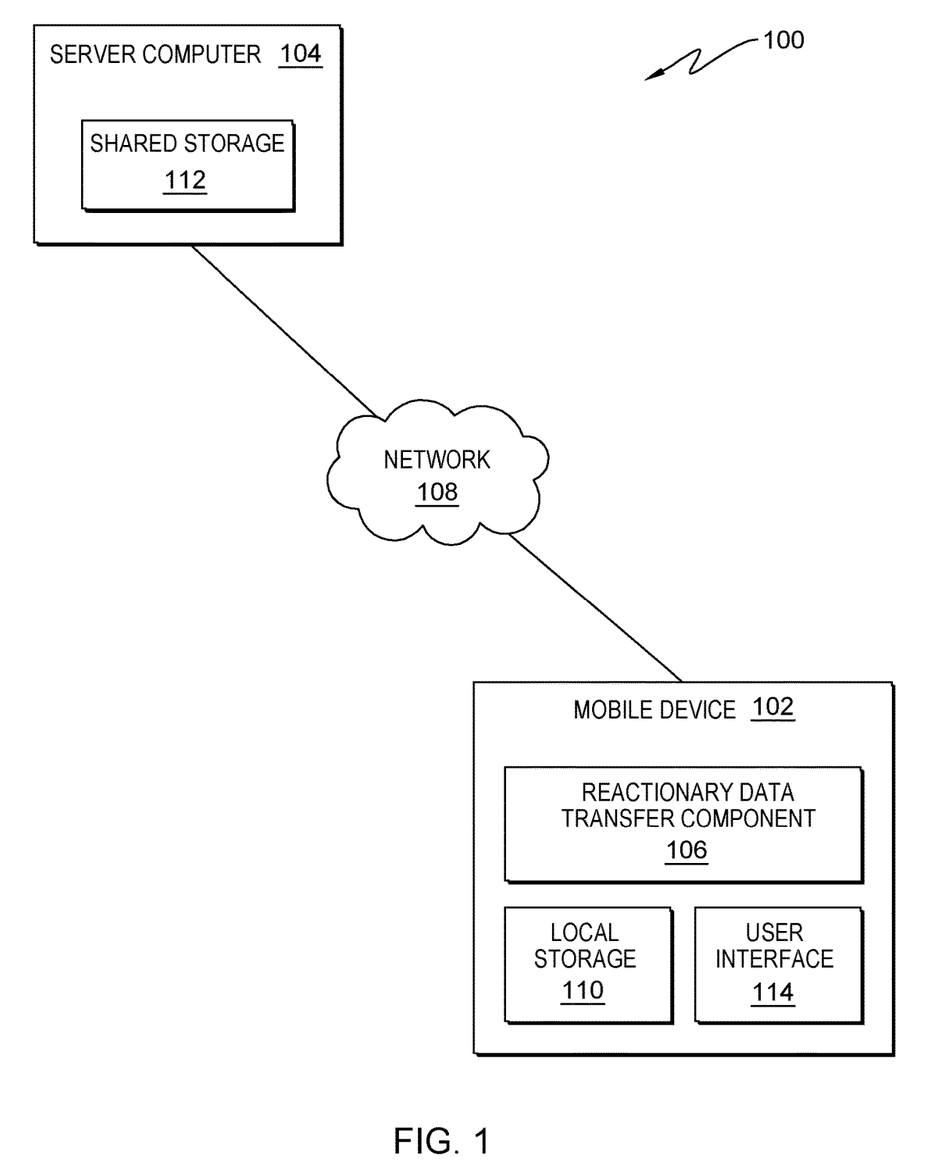
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes mobile device 102 and server computer 104, all interconnected over network 108. Mobile device 102 includes reactionary data transfer component 106, local storage 112, and user interface 114.

In various embodiments, mobile device 102 can be a standalone device, a server, a laptop computer, a tablet computer, a netbook computer, a personal computer (PC), a smart phone, a desktop computer, a smart television, a smart watch, or any combination thereof. In general, mobile device 102 are representative of any programmable mobile device or a combination of programmable mobile devices capable of executing machine-readable program instructions and communicating with users of other mobile devices via network 108 and or capable of executing machine-readable program instructions and communicating with server computer 104. For discussion purposes, in this embodiment the sensor array of mobile device 102 is damaged (i.e., broken). A Sensor array can be a group of sensors arranged in a geometric patter (i.e. square, triangle, linear, checkered, etc.), any/or any sensors used in mobile devices known in the art.

Server computer 104 may be a desktop computer, a laptop computer, a tablet computer, a specialized computer server, a smartphone, server computer or any other computer system known in the art. In certain embodiments, server computer 104 represents a computer system utilizing a cluster computers and components that act as a single pool of seamless resources when accessed through network 108, as is common in data centers and with cloud computing applications. In general, server computer 104 is representative of any programmable mobile device or combination of programmable client devices capable of executing machine-readable program instructions and communicating with other computer devices via a network.

In general, network 108 can be any combination of connections and protocols that can support communications and/or data transfer between mobile device 102, server computer 104, in accordance with a desired embodiment of the present invention. Network 108 can be, for example, cellular service, a local area network (LAN), a wide area network (WAN) such as the Internet, or a combination of the two, and may include wired, wireless, fiber optic or any other connection known in the art. In an alternative embodiment, not depicted in FIG. 1, network 108 can support communications and/or data transfer between mobile device 102 to a different mobile device (e.g., a third party mobile device).

Reactionary data transfer component 106 residing in server computer 102 has the ability to detect sensor array damage in mobile device 102 and transfer data from mobile 102 to shared storage and or another device capable of storing data. Reactionary data transfer component 106 can use the tensile strength of the sensors, and utilize the multiple point detection already built into the device. In one embodiment, reactionary data transfer component 106 can alert the device and or user of a possible break if there are any deviations in the multiple point detection. For example, reactionary data transfer component 106 can measure an abundance of sensor points, in this particular example 20 or more points, and send a notification to another mobile device via email, text and or any form of communication know in the art if the measured points detect an impact and/or damage. In another embodiment, reactionary data transfer component 106 can display a notification on mobile device 102, via user interface 114.

For example, if a user drops mobile device 102, reactionary data transfer component 106 can detect an impact and determine if there is any damage to the sensor array. If the damage is significant enough to register an impact reactionary data transfer component 106 can display a notification via text, phone call, message in an application, and or any form of communication known in the art. In this particular example, the notification may notify the user of any damage that has occurred and provide a series of operational steps. In a different embodiment, the notification may contain a location to the nearest mobile device 102 seller, service provider, and/or manufacturer. In another embodiment, reactionary data transfer component 106 may monitor mobile device 102 sensor array for damage for a pre-defined time limit. For example, a user can set reactionary data transfer component 106 to monitor sensor array damage between 7:00 AM and 10:00 PM and have the programmed turned off between 10:00 PM to 7:00 AM. In various embodiments, reactionary data transfer component 106 may monitor mobile device 102 sensor array continuously.

In other embodiments reactionary data transfer component 106 can alert the user, the seller of mobile device 102, and an emergency contact list comprising contact members selected by the user of client device 102. The emergency contact list can be phone numbers, email address, social media accounts, communication mobile applications, and/or any form of communication known in the art. In another embodiment, reactionary data transfer component 106 can have a security code available for user identification. For example, reactionary data transfer component 106 detects damage to the sensor array on mobile device 102. Reactionary data transfer component 106 can display an alert on mobile device 102. In this particular example, using user interface 114 the user of mobile device can enter a security code in order to obtain access to reactionary data transfer component 106 and the information it has collected. In another example, the program settings and break event settings for reactionary data transfer component 106 are protected by a security code. A security code can be a key combination, a pattern, a finger print, a thumb print, a password or any form of security known in the art.

Reactionary data transfer component 106 can determine the level and/or degree of damage to mobile device 102 and has various degrees of responses which correspond to the degree of damage. For example, a user drops mobile device 102 onto a carpeted floor from there chair while sitting down. In this particular example, reactionary data transfer component 106 can determine that the impact was a slight impact and that no damage has occurred. In another example, reactionary data transfer component 106 can determine that the impact was a slight impact however there is some slight damage, which may not be visible and notify the user of the damage. Whereas, in a different example, the user drops mobile device 102 from a third story balcony onto cement causing significant damage to mobile device 102. Reactionary data transfer component 106 can assess the damage and undergo a full protocol of alerting the user, any designated contacts on the emergency contact list, the seller, manufacturer, post on their social media page, and transfer all of the data stored on mobile device 102 to an available cloud back up, and or designated mobile device.

Local storage 110 and shared storage 112 are data repository's that may be written to and read by one or a combination of reactionary data transfer component 106, user interface 114, server computer 104, and or all components and applications of mobile device 102 and server computer 104 known in the art. Local storage 110 and shared storage 112 can be connected via network 108 or connected through a cable and or wired connection. Local storage 110 and Shared storage 112 can be hard drives, memory cards, computer output to laser disc (cold storage), and or any form of data storage known in the art. In one embodiment, not illustrated in FIG. 1, local storage 110 can be within server computer 104 and accessed via network 108. In one embodiment, reactionary data transfer component 106 can automatically access local storage 110 and begin transferring data to shared storage 112 via network 108, when damage to the sensor array is detected. In another embodiment, reactionary data transfer component 106 can request access to local storage 110, when damage to the sensor array is detected, and depending on the user's response can transfer data from local storage 110 to shared storage 112 via network 108. In another embodiment, not illustrated in FIG. 1, reactionary data transfer component 106 can transfer data from local storage 110 to a separate authorized mobile device via network 108. In a different embodiment, not illustrated in FIG. 1, reactionary data transfer component 106 can transfer data from local storage 110 to a separate authorized data storage device such as a portable hard drive, a USB memory stick (i.e., a thumb drive), and/or any other forms of data storage devices known in the art.

Mobile device 102 includes a user interface (UI) 114, which executes locally on mobile device 102 and operates to provide a UI to a user of mobile device 102. User interface 114 further operates to receive user input from a user via the provided user interface, thereby enabling the user to interact with mobile device 102. In one embodiment, user interface 114 provides a user interface that enables a user of mobile device 102 to interact with reactionary data transfer component 106. In various embodiments, a user can edit reactionary data transfer component 106 program settings, designated contact settings, and or break event settings via a mobile application, website, integrated mobile settings, remote server, and any combination thereof. For example, a user can enable reactionary data transfer component 106 to alert selected contacts of a breakage. In another example, via user interface, a user can enable reactionary data transfer component 106 to notify a mobile device service provider or manufacture of the damage to mobile device 102.

Figure 2:
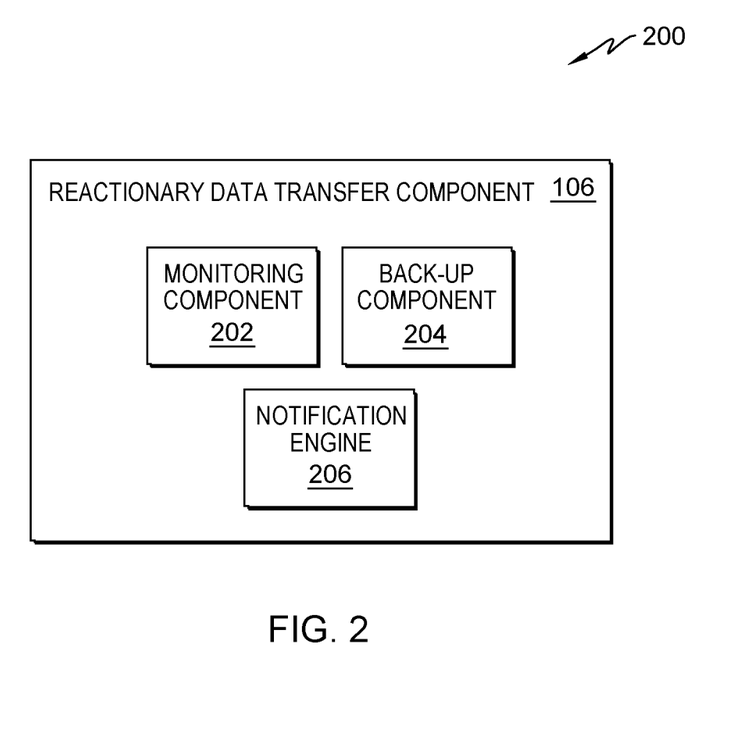
FIG. 2 is a block diagram illustrating a data processing environment within reactionary data transfer component, within the distributed data processing environment of FIG. 1, for backing-up and transferring mobile device data, in accordance with an embodiment of the present invention.

FIG. 2 is a functional block diagram illustrating a computing environment of reactionary data component 106, generally designated 200, in accordance with an embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. Computing environment 200 includes reactionary data transfer component 106. Reactionary data transfer component 106 comprises monitoring component 202, back-up component 204, and notification engine 206.

In this exemplary embodiment, monitoring component 202, is a subcomponent of reactionary data transfer component 106 housed within mobile device 102; however, monitoring component 202 can be housed within a server computer, a separate mobile device, and/or it can be a stand-alone device. In this exemplary embodiment, monitoring component 202 is housed within reactionary data transfer component 106; however, monitoring component 202 can be housed within mobile device 102, sever computer 104, network 108, and/or a third party mobile device not depicted in FIG. 1. Generally, monitoring component 202 may be housed anywhere in environment 100, as long as it is remains a subcomponent of reactionary data transfer component 106. In one particular embodiment, monitoring component 202 can consistently monitor the sensor array on a mobile devices screen. More specifically, monitoring component 202 utilizes the tensile strength sensors to monitor for any change in the tension of a mobile devices screen. A screen can be a display, a user interface, a touch screen, and/or any screen used for displaying information, images, and/or videos known in the art.

In one embodiment, monitoring component 202 notifies back-up component 204 and/or notification engine 206 of any damage detected on mobile device 102. For example, a user drops their cellphone onto the pavement. Monitoring component 202 can register the impact, assess the impact, and determine if any damage to the cellphone and/or sensor array has occurred. In this particular example, if monitoring component 202 determines that damage to the cellphone and/or the cellphones sensor array has occurred monitoring component 202 can notify back-up component 204, and notification engine 206 of the damage. In an alternative embodiment monitoring component 202 can determine various degrees of damage. In this particular embodiment, monitoring component 202 can determine if there is no damage, minor damage, moderate damage, severe damage, and/or any other degree of damage known in the art. In various embodiments, based on the degree of damage detected monitoring component 202 can issue responses and/or notifications to back-up component 204 and notification engine 206 that are tailored to the amount of damage detected.

In this exemplary embodiment, back-up component 204 is housed within reactionary data transfer component 106; however, back-up component 204 can be housed within mobile device 102, sever computer 104, network 108, and/or a third party mobile device not depicted in FIG. 1. Generally, back-up component 204 may be housed anywhere in environment 100, as long as it is remains a subcomponent of reactionary data transfer component 106. In one particular embodiment, back-up component 204 communicates directly with monitoring component 202. In this particular embodiment, back-up component 204 consistently receives information about the integrity of the sensor array in a mobile devices screen from monitoring component 202. Once monitoring component 202 detects damage to mobile device 102 sensor array, monitoring component 202 can communicate to back-up component 204 that mobile device 102 sensor array has been damaged, and back-up component 204 can begin initiating a system back of the mobile device. For example, a user cracks the screen on their smartphone, monitoring component 202 can notify back-up component 204 of the damage. In this particular example, once notified, back-up component 106 immediately begins a full data pull from the user's smartphone to an established cloud storage system. In an alternative embodiment, back-up component 204 can monitor the sensor array damage directly without the assistance of monitoring component 202. In other embodiments, back-up component 204 may issue a response tailored to the amount of impacted reported by monitoring component 202.

In other embodiments, back-up component 204 asks the user if the back-up sequence should be initiated, via notification engine 206. For example, once back-up component 106 is made aware of the damage to mobile device, it can instruct notification engine 206 to display a prompt to the user requesting permission to start pulling data from the mobile and uploading it to shared storage 112. In an alternative embodiment, the displayed data pulling and/or data back-up request can have a set time attached to the message, in which the request can either activate or deactivate after a predetermined time expires. In this particular embodiment, the timer can be factory set, pre-programmed, or determined by the user.

In this exemplary embodiment, notification engine 206 is housed within reactionary data transfer component 106; however, notification engine 206 can be housed within mobile device 102, sever computer 104, network 108, and/or a third party mobile device not depicted in FIG. 1. Generally, notification engine 206 may be housed anywhere in environment 100, as long as it is remains a subcomponent of reactionary data transfer component 106. In one particular embodiment, notification engine 206 communicates directly with monitoring component 202. In this particular embodiment, notification engine 206 consistently receives information about the integrity of the sensor array on a mobile devices screen from monitoring component 202. Once monitoring component 202 detects damage to mobile device 102 sensor array, monitoring component 202 can communicate to notification engine 206 that mobile device 102 sensor array is damaged, and notification engine 206 can begin to notify a predetermined contact list (i.e., designated contact list) that mobile device 102 has been damaged. Once notified, notification engine 206 can then begin to send scripted and/or custom notifications to selected contacts.

The notifications sent by notification engine 206 can be either text, email, voicemail, social media posting, and other form of notification known in the art. The notifications sent by notification engine 206 can either be predetermined, custom, and/or created in real time. The selected contacts can be either predetermined and/or selected in real time. For example, a user cracks the screen on their smartphone, monitoring component 202 can communicate the detected damage to notification engine 206. Once notified, notification engine 206 can begin sending a notification to a predetermined list of contacts. In this particular example, the notification can notify the predetermined contact list that your phone is damaged and provide them with alternative method of contacting the user. In a different example, a user shatters the screen on their smartphone, monitoring component 202 can communicate the detected damage to notification engine 206. Once notified, notification engine 206 can begin posting a predetermined message on social media to notify the users social media followers that the user's smartphone is damaged/and or broken. In an alternative embodiment, a user can determine who can receive the predetermined message. The user can select which social media followers receive the notification. For example, it may all of their followers, a select few, and/or a public social media posting.

In an additional embodiment, the user can create a message to post on social media. In a different embodiment, once notified of any damage to mobile device 102, notification engine 206 can notify the users cellular service provider, seller and/or the manufacture of mobile device 102 of the damage to mobile device 102, and or place an order for a new mobile device 102. In an alternative embodiment, the notifications can be timed controlled or automatic. For example, if the user damages the screen on their smartphone and is unable to type a personal notification, notification engine 206 can automatically generate a notification to be posted on social media after a predetermined time has lapsed. In an alternative embodiment, notification engine 206 can monitor the sensor array damage directly without the assistance of monitoring component 202.

Figure 3:
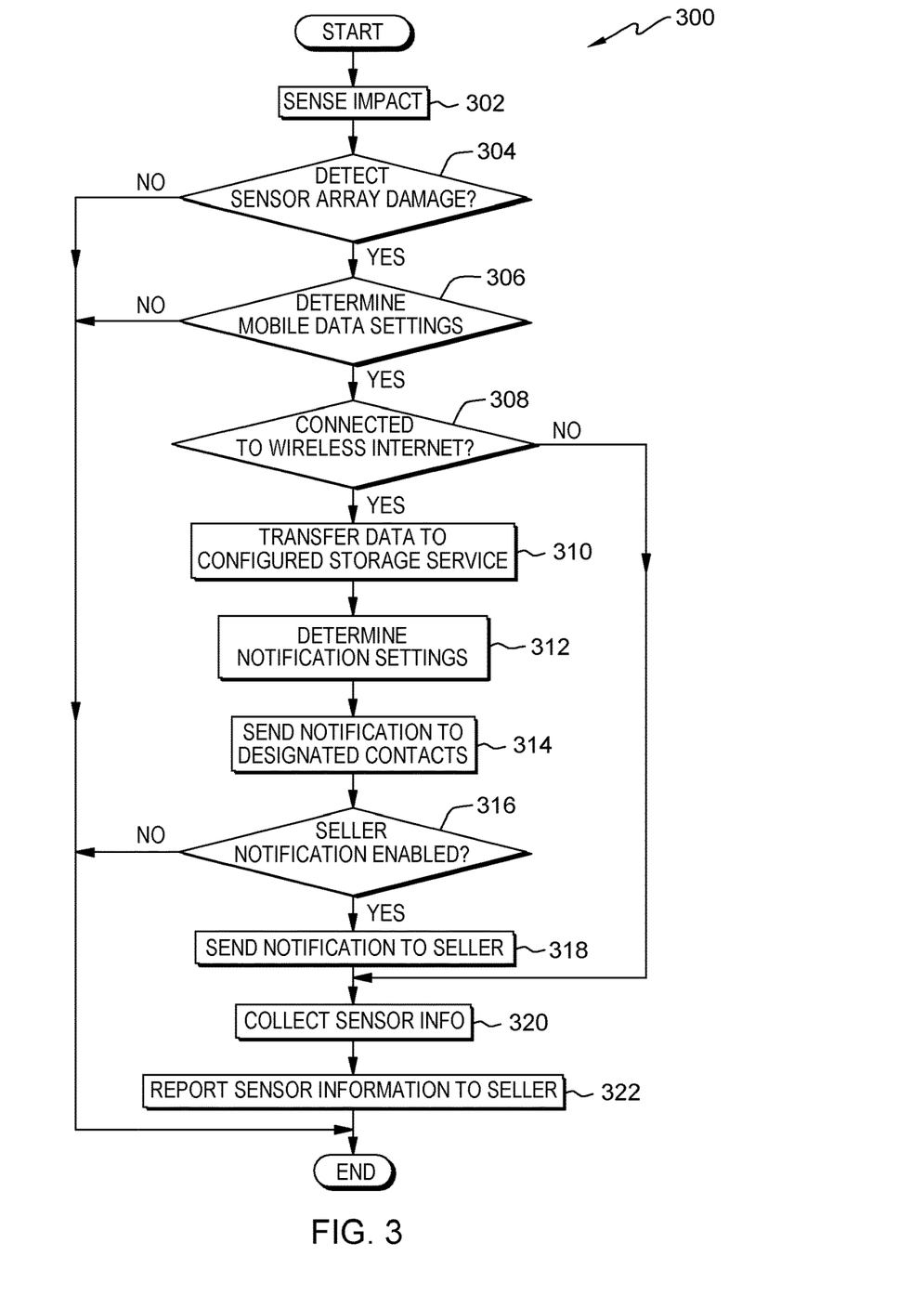
FIG. 3 illustrates operational steps of a reactionary data transfer component, on a mobile device within the distributed data processing environment of FIG. 1, in accordance with an embodiment of the present invention.

FIG. 3 is a flowchart depicting operational steps of reactionary data transfer component 106, generally designated 300, on a server computer 104 within distributed data processing environment 100 of FIG. 1, sensor array monitoring and data transfer, in accordance with an embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

In step 302, monitoring component 202 senses that mobile device 102 has endured some form of impact. Impact, may be any form of damage to the mobile device such as, a drop, a slam, a scratch, water damage, electrical damage, heat, increased pressure, or any other form of damage known in the art. In this particular embodiment, mobile device 102 is dropped by the user. For example, a user walking and texting on mobile device 102 drops mobile device 102 onto the pavement causing mobile device 102 to be damaged. In a different example, a user is sitting in a café and accidently spills liquid onto mobile 102 resulting in damaging mobile device 102. In another example, a user is out for a jog when mobile device 102 slips out of the user's pocket and falls onto the ground causing mobile device 102 screen to crack and/or shatter. In the current example, once damage occurs to mobile device 102 monitoring component 202 senses the damage to mobile device 102 screen and begins notifying back-up component 204 and/or notification engine 206. In an alternative embodiment, monitoring component 202 can notify notification engine 206 of the impact.

In step 304, monitoring component 202 determines whether any damage to the sensor arrays on mobile device 102 have been detected. In one embodiment, monitoring component 202 is constantly monitoring for any changes in the sensor array tensile strength sensors and/or tension of mobile device 102 screen. In one embodiment, monitoring component 202 can utilize the sensors within mobile device 102 and/or the sensors within mobile device 102 screen to create a sensory array. For example, monitoring component 202 uses the sensors within a smartphone's screen creating a sensor array, and consistently monitors the sensor array for any change, utilizing the tensile strength sensors (i.e. the tension of the screen). In this particular example, monitoring component 202 can utilize the multiple point detection sensors already built onto the device, and measure an abundance of points (at least 20). However, the abundance of points can be at least 1 point. In an alternative embodiment monitoring component 202 utilizes a mobile devices existing sensor array.

In various embodiments, if monitoring component 202 senses impact it can determine if the mobile device 102 has sustained any damage, by analyzing the integrity of the sensor array. In the event monitoring component 202 determines there is no damage ("no" branch 304), no action can be taken and/or the reactionary data transfer to cold storage can end. However, in this particular embodiment, if monitoring component 202 detects damage to mobile device 102 ("yes" branch 304), reactionary data transfer component 106 can access the mobile data settings (306). In one embodiment monitoring component 202 can determine and/or distinguish the severity of damage to mobile device 102, and depending on the severity of the damage, monitoring component 202 can respond differently.

For example, a user drops their tablet and cracks the screen on the tablet; however, the crack is minor and cannot impede its everyday use. Monitoring component 202, can then enable the user to manually enable and disable steps to reactionary data transfer component 106. In other embodiments, if the damage to mobile device 102 is minor, monitoring component 202 can display a prompt to end the process of reactionary data transfer to cold storage. In a different embodiment, if the damage to mobile device 102 is minor, monitoring component 202 can be programmed to automatically end process. However, in one embodiment, if the damage to mobile device 102 is severe monitoring component 202 can conduct the whole process manually.

In step 306, monitoring component 202 determines the mobile data settings for mobile device 102. Mobile data settings can comprise of wireless connection, data storage housed on mobile device 102 (i.e., local storage 110), external data (i.e., shared storage 112), cloud sharing, and any other forms of data and/or mobile data known in the art. Mobile data settings enable the user to set preferred methods of mobile data management. In one particular embodiment, a user can edit mobile data settings via mobile application, website, mobile device 102 settings, remote server and/or a third party's mobile device. Simply, a user can determine which mobile data settings to enable or disable. In one embodiment, a user can select to enable reactionary data transfer component 106 and/or any of its subcomponents access to mobile device 102 mobile data settings.

For example, a user can select to enable or disable reactionary data transfer component and/or its subcomponents access to mobile device 102 contacts, photos, email, cloud, applications, and/or any other forms of data known in the art. If a user selects to enable reactionary data transfer component 106 and/or its subcomponents, then reactionary data transfer component 106 and/or its subcomponents can continue the reactionary data transfer process. In one particular embodiment, once back-up component 204 is made aware of the damage to mobile device 102, then back-up component 204 can begin to prepare data offload. In an alternative embodiment, not depicted in FIG. 3, a user can select to prohibit reactionary data transfer component 106 and/or any of its subcomponents access to mobile device 102 mobile data settings. In this particular embodiment, the user selects to prohibit reactionary data transfer component 106 and/or any of its subcomponents access to mobile device 102 mobile data settings then the process can end.

In step 308, back-up component 204 determines whether mobile device 102 is connected to network 108. In various embodiments, back-up component 204 can access mobile device 102 network settings and determine if mobile device 102 is capable of accessing server computer 104 by either wireless internet, directly connected to the internet (e.g., Ethernet connection), and/or cellular service. In other various embodiments, notification component 202 notifies back-up component 204 that damage to mobile device 102 screen has been detected. In some embodiments, a user may be able to adjust mobile device 102 network settings via mobile data settings, and can select to either disable or enable network connectivity. In other embodiments, back-up component 204 can use mobile device 102 general information to determine if mobile device 102 possesses any cellular service. If back-up component 204 determines mobile device 102 is connected to network 108 ("yes" branch, 310), then back-up component 204 may begin a transfer all of the data on mobile device 102 (i.e., data offload) to a configured storage service (i.e., shared storage 112). However, in this particular embodiment, if back-up component 204 determines there is no network connection then back-up component 204 may collect sensor info ("no" branch, 320).

In step 310, back-up component 204 transfers mobile device 102 data to a configured storage service (i.e., shared storage 112). In other embodiments, not depicted in FIG. 3, back-up component 204 may transfer the data from mobile device 102 to a configured separate mobile device. In various embodiments, once back-up component 204 is made aware of the damage to mobile device and determines there is network connectivity then back-up component 204 may initiate a transfer of all the data stored on mobile device 102 (i.e., data offload) to shared storage 112. In some embodiment, using the mobile data settings, a user can select and determine what type of data they want to enable or disable for data transfer. For example, a user can select to enable just their contacts and photo's to be transferred from their smart phone to a cloud based service. In another example, a user can select to enable all of the transferrable data stored on their smart phone to a cloud based service.

In step 312, notification engine 206 determines mobile device 102 notification settings. In various embodiments, notification engine 206 accesses mobile device 102 mobile data settings and/or general settings to determine the notification settings. In some embodiments, the user can determine the notification settings by selecting to enable and/or disable the notification settings. In other embodiments, a user can create a designated contact list, in which the user can determine which contacts they would like to enable and/or disable from receiving a notification from notification engine 206. In an alternative embodiment, notification settings enable a user to determine whether they wish to enable or disable notification engine 206 from distributing a to mobile device 102 sellers.

In step 314, notification engine 206 sends notifications to a designated contact list. In one embodiment, the user can create a designated contact list, which can be accessed by notification engine 206, and when notification engine 206 is made aware that mobile device 102 has been damaged notification engine 206 can distribute a predetermined message to the contacts on the designated contact list. For example, if a user cracks the screen on their tablet, then monitoring component 202 can alert notification engine 206 of the damage and notification engine 206 can automatically begin sending notifications to the members on the designated contact list.

In a different embodiment, monitoring component instructs notification engine 206 on how to respond to the damage based on the degree of damage registered by monitoring component 202. For example, a user drops their smartphone causing the touch screen to slightly crack. Despite small cracks in the screen, the phone is still functional and merely has a cracked screen. In this particular example, monitoring component 202 would then instruct notification engine 206 that the damage is minor and that the user can manually conduct the reactionary data transfer process through a series of prompts on mobile device 102. The user would by enabled to craft notifications and/or messages, edit the designated contact list, skip steps in the data transfer process, and/or cancel the process. In an alternative embodiment, notification engine 206 posts notifications on social media and/or send notifications to contacts on the designated contact list when notification engine 206 is alerted mobile device 102 is damaged. In a different embodiment, notification engine 206 sends notifications to all existing contacts associated with mobile device 102.

In step 316, notification engine 206 determines whether the seller notification is enabled, via seller notification settings. A seller can be a retail store, a service provider, a manufacturer, any company and/or person who buys, sells, provides service, and/or services mobile device 102. In various embodiments, once notification engine 206 is made aware of the damage to mobile device 102 screen, and sends notifications to the users designated contact list, notification engine 206 may determine if a notification should be sent to a seller. In assorted embodiments, a user can select to enable and/or disable the seller notification setting. In this particular embodiment, the seller notification setting enables a user to select to either enable or disable notification engine 206 from automatically sending a notification to the seller of mobile device 102, in the event there is damage to mobile device 102. The notification sent to the seller can be auto selected from a pre-composed message bank, created by the user in real time, pre-programmed, or any combination thereof. If the user selects to enable the seller notification, then notification engine 206 can send the seller a notification if mobile device 102 is damaged (step, 318). If the user selects to disable the seller notification, then notification engine 206 can terminate the notification to the seller and collect sensor data (step, 320).

In a different embodiment, notification engine 206 presents a prompt on user interface 114. In this particular embodiment, the prompt presents the option to the user to either enable notification engine 206 to send a notification to the sell or stop notification engine 206 from sending a notification to the seller. In another embodiment, a response timer is attached to the notification prompt. If the user doesn't respond to the notification within the programmed set time notification engine 206 can automatically send a notification to the seller. In other embodiments, notification engine 206 can terminate the notification to the seller if the user doesn't respond to the prompt. In an alternative embodiment, the user can determine the amount of time allowed for a response to the prompt. In yet another embodiment, a user can select if notification engine 206 can send or terminate the notification if a response is or isn't recorded. In alternative embodiments, not depicted in FIG. 3, reactionary data transfer program may have internet of things (IoT) capability that enables the seller to utilize the data retrieved from back-up component 204. In this particular embodiment, notification engine 206 can determine whether the internet of things (IoT) setting is enabled to sharing data information with the seller and/or competitors. In some embodiments, utilizing the IoT would allow for the seller and/or competing providers to identify future potential sales, product design, improvement in production quality and/or engineering opportunities.

In step 318, notification engine 206 sends a notification to the seller. In various embodiments, stated previously, if the seller notification is enabled notification engine 206 may send a notification to the seller notifying them of the damage to mobile device 102. In some embodiments, the notification to seller may comprise: the amount and/or degree of damage to mobile device 102, a request to order a new phone, and/or the users shipping information. In different embodiments, the notification sent to the seller can be an order for a new mobile device 102. In various embodiments, the notification sent to the seller may contain a data file comprising the back-up data retrieved by back-up component 204 (i.e. data offload) from mobile device 102. In this particular embodiment, the data file comprising the back-up data may be used to upload the old data to the newly ordered mobile device 102. In other embodiments, the notification to the seller may contain an access code and/or link to a cloud based service, in which leads to mobile device 102 back-up data.

In step 320, monitoring component 202 collects the sensor array data from the detected impact. In various embodiments, monitoring component 202 collects the sensor array data from the detected impact, in which monitoring component 202 compiles the data into a data report. In this particular embodiment, the data report compiles the sensor array integrity (before and after the impact), amount of screen fraction, point of impact, the degree of intensity of the impact, and/or any other forms of data that can be retrieved from a sensor array known in the art. In some embodiments, not depicted in FIG. 3, monitoring component 202 can begin collecting sensor array data the moment an impact is sensed. In other embodiments, monitoring component 202 may constantly record and/or collect sensor array.

In step 322, notification engine 206 report's the sensor information collected from mobile device 102 to the seller. In various embodiments, the information and/or data may help the seller identify future potential sales, product design, improvement in production quality and/or engineering opportunities. In some embodiments, the sensor report may be stored on local storage 110 and/or shared storage 112. In various embodiments, the seller may access the sensor report at any time following user consent.

Figure 4:
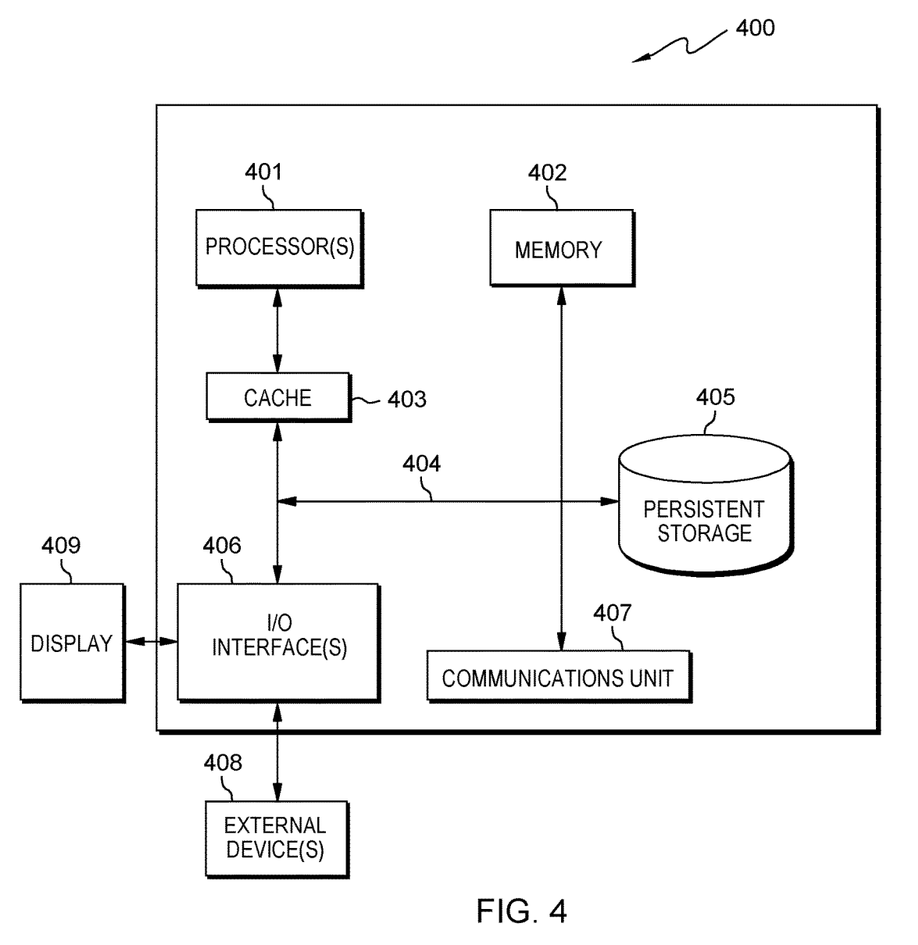
FIG. 4 depicts a block diagram of components of the server computer executing the intelligent mapping program within the distributed data processing environment of FIG. 1, in accordance with an embodiment of the present invention.

FIG. 4 depicts a block diagram of components of a computing device within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 4 depicts computer system 400, where server computer 104 represents an example of computer system 400 that includes reactionary data transfer component 106. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

What is claimed is:

1. A computer-implemented method for reactionary data transfer, the method comprising:
  sensing, by one or more processors, damage to a mobile device based on tensile strength of one or more sensors and integrity of one or more sensor arrays, associated with the mobile device, wherein the one or more sensors and the one or more sensor arrays are monitored for physical damage for a pre-defined time limit;

determining, by the one or more processors, a degree of damage to the one or more sensors and the one or more sensor arrays, wherein determining the degree of damage comprises:
  analyzing, by the one or more processors, the integrity of the one or more sensor arrays;
  responsive to the analyzing indicating the degree of damage to the one or more sensor arrays is greater than a predetermined threshold, determining, by the one or more processors, if mobile data settings, associated with the mobile device, are enabled;
  responsive to determining the mobile data settings are enabled and receiving instructions from the mobile data settings, transferring, by the one or more processors, data from the mobile device to a storage location;
determining, by the one or more processors, notification settings for the mobile device; and
responsive to receiving instruction from notification settings, sending, by one or more processors, a notification to designated user contacts.

2. The computer-implemented method of claim 1, further comprising:
  determining, by the one or more processors, the seller notification settings; and
  responsive to receiving instructions from the seller notification settings, sending, by the one or more processors, a notification to a seller.

3. The computer-implemented method of claim 2, further comprising:
  collecting, by the one or more processors, sensor information from the mobile device; and
  responsive to receiving instructions from the seller notification settings, reporting, by the one or more processors, the sensor information to the seller.

4. The computer-implemented method of claim 2, wherein a portion of sending a notification to a seller comprises a request for a new mobile device.

5. The computer-implemented method of claim 4, wherein the portion of sending a notification to a seller further comprises downloading the data from the storage location to the new mobile device.

6. The computer-implemented method of claim 1, wherein the notification sent to the predetermined contact list comprises one or more of: a text, an email, a voicemail, and a social media post.

7. The computer implemented method of claim 1 further comprising contacting, by the one or more processors, a mobile device service provider and ordering, by the one or more processors, a new mobile device, wherein the new mobile device comprises the data transferred to the configured storage service; and
  wherein the notification settings automatically post a custom message to a user's one or more social media accounts and notifies a predetermined contact list after a predetermined time from the determination of damage has lapsed that the user's mobile device is out of service.

8. A computer program product for reactionary data transfer, the computer program product comprising:
  one or more computer readable storage devices and program instructions stored on the one or more computer readable storage devices, the stored program instructions comprising:
    program instructions to sense damage to a mobile device based on tensile strength of one or more sensors and integrity of one or more sensor arrays, associated with the mobile device, wherein the one or more sensor and the one or more sensor arrays is monitored for physical damage for a pre-defined time limit;
    program instructions to determine a degree of damage to the one or more sensors and the one or more sensor arrays, wherein determining the degree of damage comprises:
      program instructions to analyze the integrity of the one or more sensor arrays;
      responsive to the analyzing indicating the degree of damage to the sensor arrays is greater than a predetermined threshold, program instructions to determine if mobile data settings associated with the mobile device, are enabled;
    responsive to determining the mobile data settings are enabled and receiving instructions from the mobile data settings, program instructions to transfer data from the mobile device to a configured storage service;
    program instructions to determine notification settings for the mobile device; and
    program instructions to, responsive to receiving instruction from notification settings, send a notification to designated user contacts.

9. The computer program of claim 8, further comprising:
  program instructions to, determine, the seller notification settings; and
  program instructions to, responsive to receiving instructions from seller notification settings, send a notification to a seller.

10. The computer program product of claim 9, further comprising:
  program instructions to, collect, sensor information from the mobile device; and
  program instructions to, responsive to receiving instructions from seller notification settings, report, the sensor information to the seller.

11. The computer program product of claim 9, wherein the portion of sending a notification to a seller comprises a request for a new mobile device.

12. The computer program product of claim 11, wherein the portion of sending a notification to a seller comprises a request for a new mobile device, further comprises, downloading the data from the storage service.

13. The computer program product of claim 8, wherein the notification sent to the designated user contacts comprises one or more of: a text, an email, a voicemail, and a social media post.

14. The computer program product of claim 8 further comprising:
  program instructions to contact a mobile device service provider and ordering, by the one or more processors, a new mobile device, wherein the new mobile device comprises the data transferred to the configured storage service; and
  wherein the notification settings automatically post a custom message to a users one or more social media accounts and notifies a predetermined contact list after a predetermined time from the determination of damage has lapsed that the user's mobile device is out of service.

15. A computer system comprising:
one or more computer processors;
one or more computer readable storage devices;
program instructions stored on the one or more computer readable storage devices for execution by at least one of the one or more computer processors, the stored program instructions comprising:

program instructions to sense damage to a mobile device based on tensile strength of one or more sensors and integrity of one or more sensor arrays, associated with the mobile device, wherein the one or more sensor and the one or more sensor arrays is monitored for physical damage for a pre-defined time limit;

program instructions to determine a degree of damage to the one or more sensors and the one or more sensor arrays, wherein determining the degree of damage comprises:

program instructions to analyze the integrity of the one or more sensor arrays;

responsive to the analyzing indicating the degree of damage to the sensor arrays is greater than a predetermined threshold, program instructions to determine if mobile data settings, associated with the mobile device, are enabled;

responsive to determining the mobile data settings are enabled and receiving instructions from the mobile data settings, program instructions to transfer data from the mobile device to a configured storage service;

program instructions to determine notification settings for the mobile device; and program instructions to, responsive to receiving instruction from notification settings, send a notification to designated user contacts.

16. The computer system of claim 15, further comprising:
program instructions to, determine, the seller notification settings; and program instructions to, responsive to receiving instructions from seller notification settings, send a notification to a seller.

17. The computer system of claim 16, further comprising:

program instructions to, collect, sensor information from the mobile device; and program instructions to, responsive to receiving instructions from seller notification settings, report, the sensor information to the seller.

18. The computer system of claim 16, wherein the portion of sending a notification to a seller comprises a request for a new mobile device.

19. The computer system of claim 18, wherein the portion of sending a notification to a seller comprises a request for a new mobile device, further comprises, downloading the data from the storage service.

20. The computer system of claim 15 further comprising:

program instructions to contact a mobile device service provider and ordering, by the one or more processors, a new mobile device, wherein the new mobile device comprises the data transferred to the configured storage service; and wherein the notification settings automatically post a custom message to a users one or more social media accounts and notifies a predetermined contact list after a predetermined time from the determination of damage has lapsed that the user's mobile device is out of service.

* * * * *